(12) United States Patent
Palladino

(10) Patent No.: US 8,196,540 B2
(45) Date of Patent: Jun. 12, 2012

(54) TUNED VENTED HULL

(76) Inventor: Michele Palladino, Toronto (CA)

( * ) Notice: Subject to any disclaimer, the term of this patent is extended or adjusted under 35 U.S.C. 154(b) by 923 days.

(21) Appl. No.: 11/837,431

(22) Filed: Aug. 10, 2007

(65) Prior Publication Data

US 2008/0110388 A1 May 15, 2008

Related U.S. Application Data

(60) Provisional application No. 60/822,168, filed on Aug. 11, 2006.

(30) Foreign Application Priority Data

Mar. 30, 2005 (CA) ....................................... 2498300

(51) Int. Cl.
*B63B 1/32* (2006.01)
(52) U.S. Cl. ....................................................... 114/288
(58) Field of Classification Search .................. 114/288, 114/289, 290; 188/266, 267, 378, 379, 380; 267/136; 318/460
See application file for complete search history.

(56) References Cited

U.S. PATENT DOCUMENTS 7,222,704 B2 * 5/2007 Pearson et al. ................ 188/378

FOREIGN PATENT DOCUMENTS

| CA | 1119895 | 3/1982 |
|---|---|---|
| CA | 2498300 | 8/2006 |

OTHER PUBLICATIONS

Walsh, M.J. & Weinstein, L.M. 1978. "Drag and Heat Transfer on Surfaces . . ." AIAA Paper No. 78-1161, AIAA 11th Fluid and Plasma Dynamics Conference, Seatle,Wa.

* cited by examiner

*Primary Examiner* — Lars A Olson

(57) ABSTRACT

A harmonic apparatus designed to affect the performance of waterborne vessels. The vibratory generator is tuned with respect to the fundamental frequency of the vessel at the onset of planning, the various wave patterns generated by the moving vessel and the kinematics of the vortex sheet. As the vessel moves through water, vibrational reactions occur that assist the performance of the vessel. The harmonic apparatus can be reconfigured to operate on several different modalities.

16 Claims, 7 Drawing Sheets

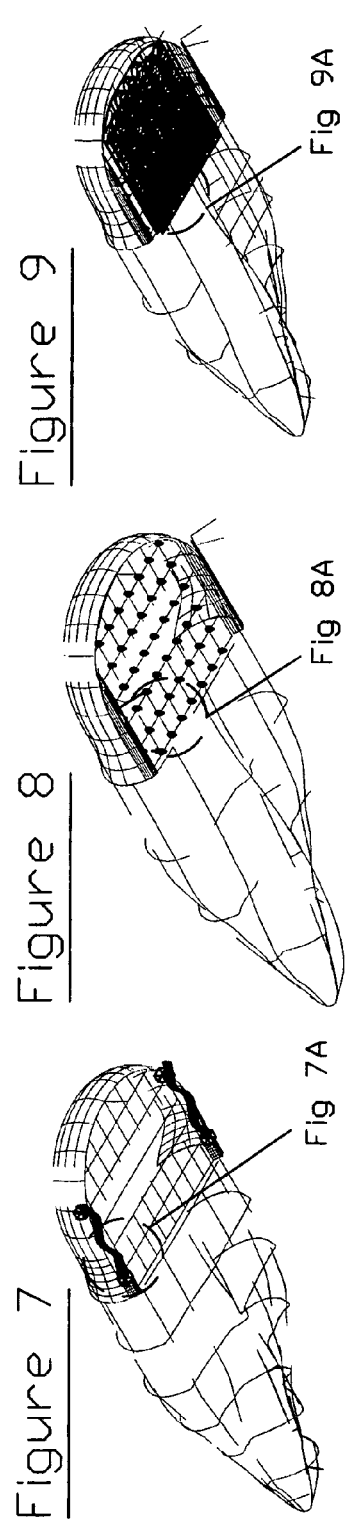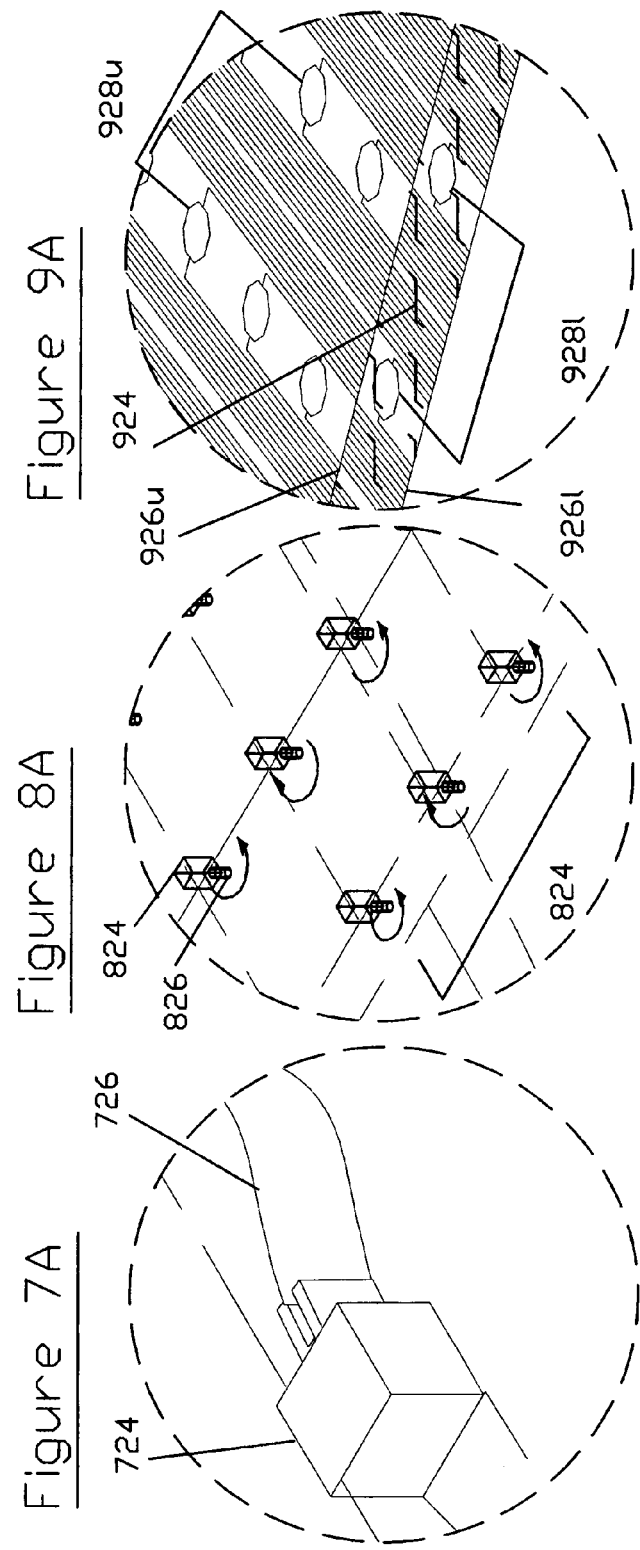

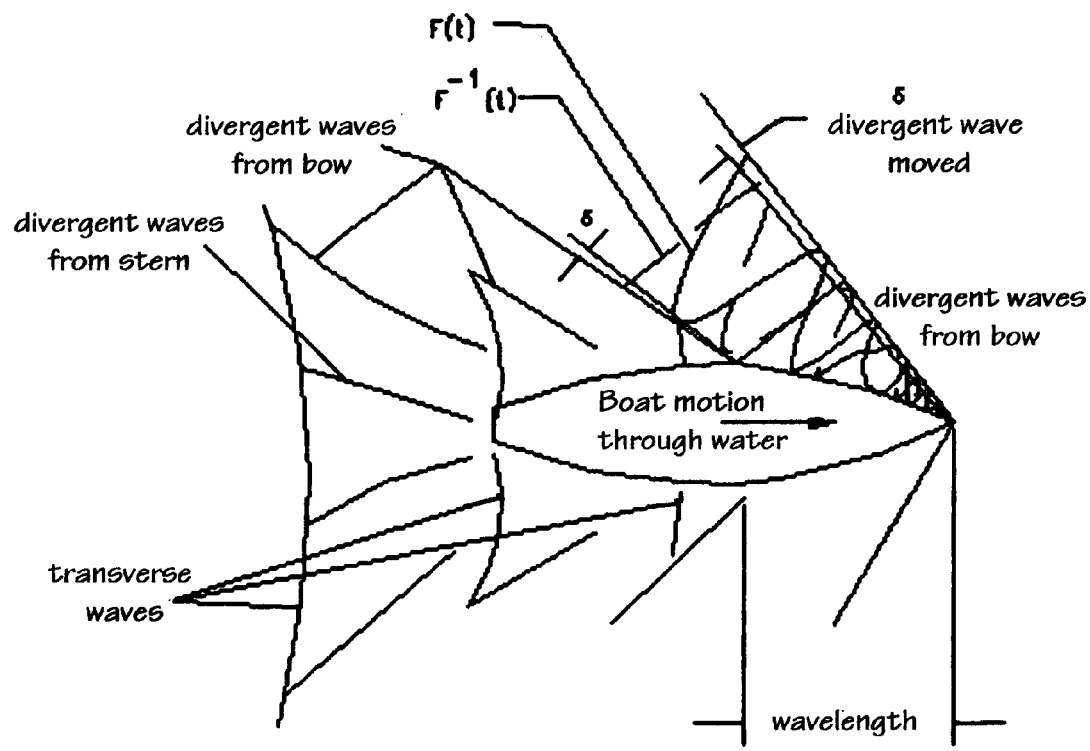

TUNED VENTED HULL

CROSS REFERENCE TO

USPTO Provisional patent application No. 60/822,168 filed Aug. 11, 2006 by present inventor.

BACKGROUND OF THE INVENTION

1. Field of Invention

This invention relates primarily to the reactions between the hull of a watercraft and the fluid flow.

2. Prior Art

A prior art search did not find any pertinent reference involving this invention. This invention deals with the fluid flow resulting from a moving watercraft. Generally, watercrafts are a type of waterborne vessels that have a hull and a deck; the hull interacts with the water as the waterborne vessel moves; and the operator, or passengers, occupies the deck. As the watercraft moves through the water, a fluid flow is generated proximate to the hull. The fluid flow characteristics around the hull are normally related to the morphology of the hull. The morphology is described by parametric constraints and some of these constraints include: the precise geometry of the hull, the beam to length ratio, the prismatic coefficient, the beam of waterline, and other factors describing the hull's form.

Marine engineering is a broad subject and all the variables, factors, circumstances and exceptions cannot be fully discussed in this disclosure. Generally, the operating conditions of the hull dictate the morphology of the hull. For example, hulls designed for hydroplaning have larger beam to length ratio than non-hydroplaning hulls. Most hulls are static structures, namely their parametric properties are fixed, and the geometry of the hull is designed for a particular operating condition, such as hydroplaning or low speed cruising. The specific operating conditions influence the design of the hull (i.e. Froude number, drag characteristics, displacement requirements, etc), and the resulting fluid flow characteristics.

Succinctly, the fluid flow characteristics are generally related to the morphology of the hull. This is a limitation of the current art where the fluid flow characteristics are generally rigidly related to the parametric properties of the hull. That is, properties such as beam to length ratio and hull geometry, which dictate the performance of the vessel. The apparatus of this invention addresses this limitation by interacting between the hull and the fluid flow in a dynamic manner.

As demonstrated in the primary embodiment, this invention is implemented using vented hull technology. The vented hull embodiment is chosen to demonstrate this invention because it has many benefits such as: a lack of added drag components, lower cost componentry, and it can easily be incorporated into hulls that use vented hull technology. Vented hull technology has a long history in modern navel architecture. As early as 1865 John Scott Russell developed the concept of "Air Lubrication". He formed this concept by pumping air around the hull to reduce skin friction (viscous drag). This concept has been further refined over the years, and steps were later developed to assist in sucking air into the bottom of the hull (such as in the 1912 vessel "The Maple Leaf"). Some of the greatest research and development in this field was done during World War Two, and later these inventions where incorporated into seaplane hulls. These are published in the American National Advisory Committee for Aeronautics reports of that time (the NACA is the precursor to NASA).

There are many inventive refinements to the vented hull as illustrated in NACA reports and more recently in Canadian Patent No. CA 1119895 dated Mar. 16, 1982, granted to LANTZ, HARLAN G., for "MULTIPLE STEP VENTED HULL". These refinements deal primarily with skin friction (viscous drag); aeration is used to reduce the surface area of the hull with respect to water flow. As a consequence of aeration, the fluid flow is manipulated as a secondary effect, and in this example, the fluid flow characteristics are still passively related and directed by the morphology of the hull.

The primary modality of this invention is with respect to viscous drag and as a consequence of using this invention the fluid flow characteristics can be manipulated. This invention also relates to the wave drag. There are two major components of hydrodynamic drag on the surface of a watercraft: wave drag, and viscous drag. There are many theories that explain the various aspects of the fluid flow characteristics, however, this invention is based on three fluid mechanic theories: wave theory, vortex sheet theory and the law of wall. The invention has at least three modalities based on the above theories, as mentioned wave theory, vortex sheet theory and the law of wall. The apparatus of this invention can be reconfigured to operate based on these modalities. The third modality (law of wall) is implemented using a method based on Walsh and Weinstein (1978-refer to information disclosure statement).

The major deficiencies with the prior art addressed by this invention are: the manipulation of the fluid flow characteristics over a wide Froude number range (this apparatus can be reconfigured to operate with a variety of modalities), the dynamic interaction between the hull and the fluid flow, the flexibility to be implemented in a variety of ways that do not require vented hull technology, and a wide variety of tuning methods that effect the performance (i.e. drag, efficiency and the handling of the vessel). There are many secondary effects that depend upon the actual implementation method; some of these will be elaborated in the alternative embodiment section of this disclosure, especially the auxiliary benefits of this apparatus with respect to viscous drag.

OBJECTS AND ADVANTAGES

One of the Innovative aspects of this invention is the dynamic interaction between the hull of a vessel and the fluid flow. This allows for a wider variety of performance tuning such as, drag, stability, and efficiency tuning. A significant feature of this invention is the ability to operate using various modalities. This apparatus can be reconfigured to operate or interact with the fluid flow using a multitude of methods and techniques. The dynamic interactions are not limited to one form, as this apparatus has the ability to respond to changes in speed of the vessel, fluid flow conditions and many other tuning considerations that the hull designer may have (such as handling). This apparatus can use a variety of different forms to manipulate the fluid flow, such as the use of sonic transmissions or various forms of direct\indirect mechanical manipulation.

DRAWINGS—FIGURES OF PRIMARY EMBODIMENT

The invention, as exemplified by a preferred embodiment, is described with reference to the drawings in which.

Figures of Alternative Embodiments

Figure 5:
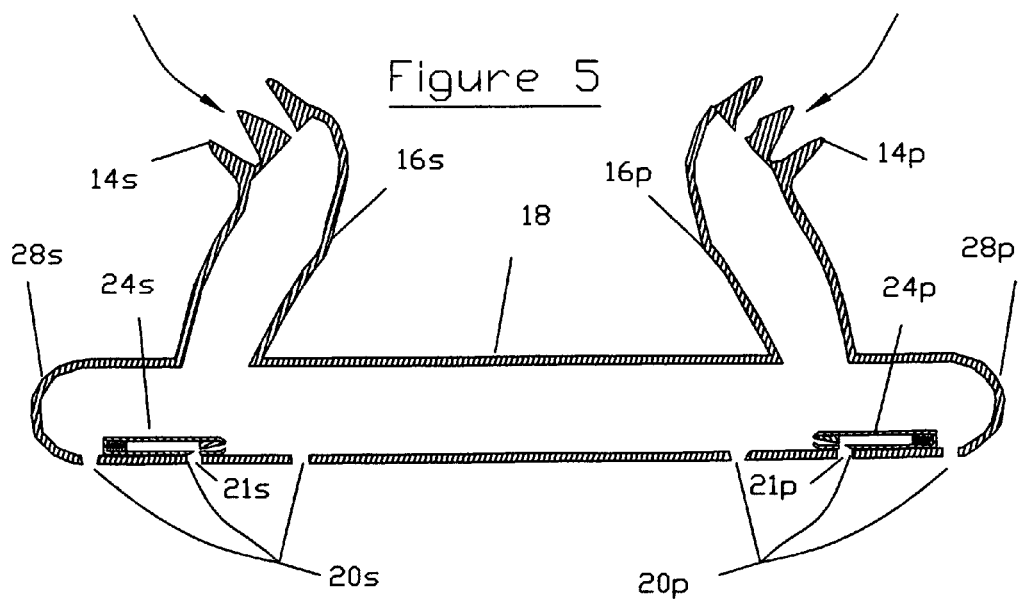
FIG. 5 is a front sectional view of the apparatus as indicated in FIG. 4.
Figure 6:
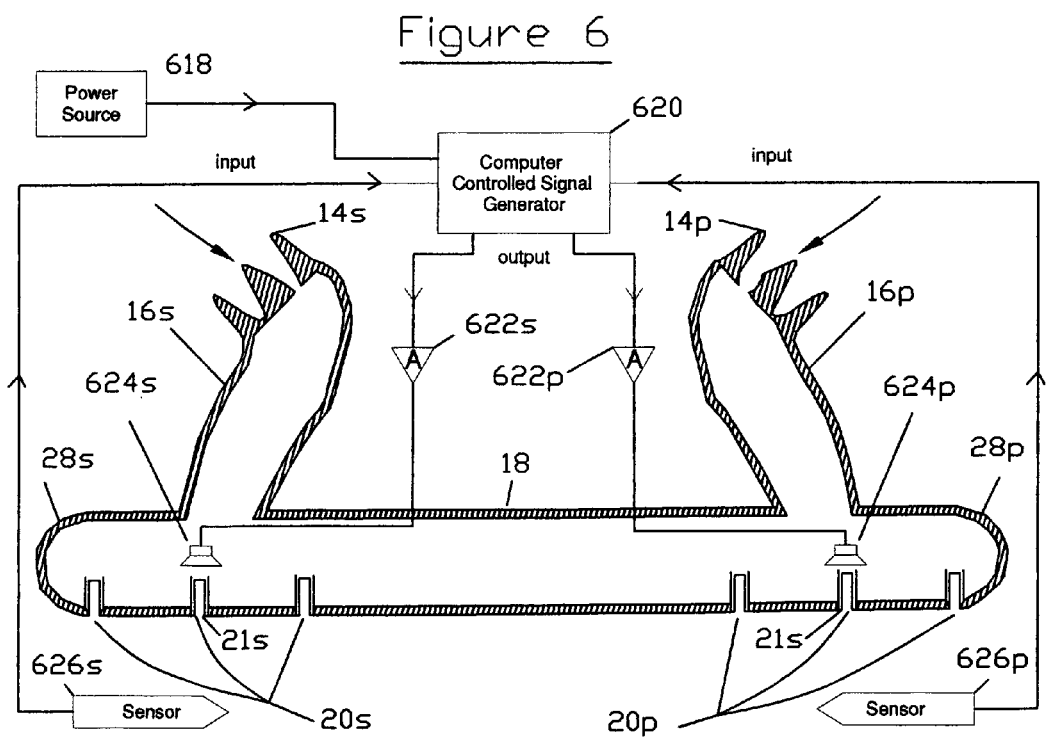

FIG. 6 is a front sectional view of the invention similar to that of FIG. 5 whereby the apparatus utilizes electronics.

FIG. 7 is a perspective view of a boat hull with an electro-mechanical vibratory generator.

FIG. 7A is an enlarged view of the electromechanical vibratory generator as shown in FIG. 7.

FIG. 8 is a perspective view of a boat hull with a rotational electromechanical vibratory generator.

FIG. 8A is an enlarged view of the rotational mechanical vibrator as shown in FIG. 8.

FIG. 9 is a perspective view of the hull of a boat with an experimental double skin.

FIG. 9A is an enlarged view of the vibratory generator incorporated into the double hull as shown in FIG. 9.

Figure 12A:
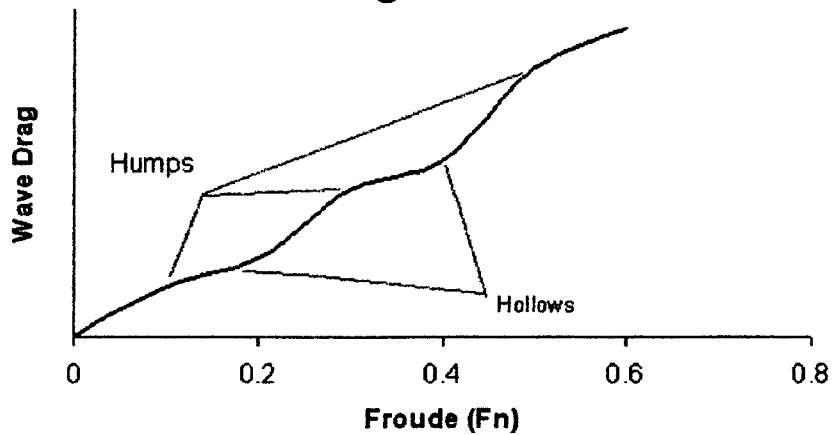

FIG. 12A demonstrates the relationship between drag and boat speed.

Figure 12B:
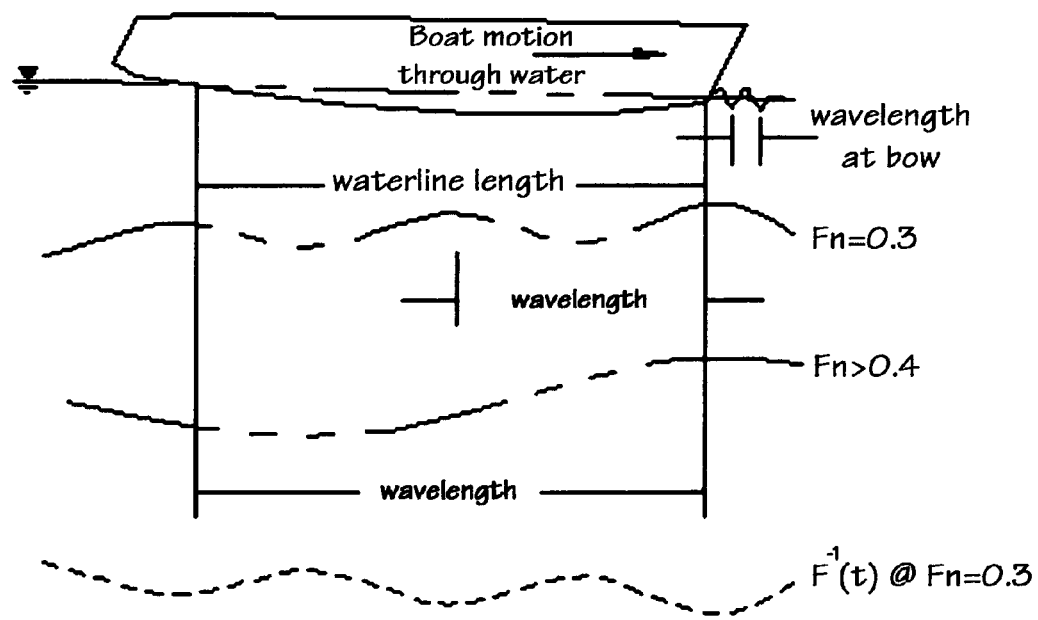

FIG. 12B demonstrates fluid wavelength with respect to boat motion.

FIG. 12C demonstrates the wave system in the fluid.

Figure 12D:
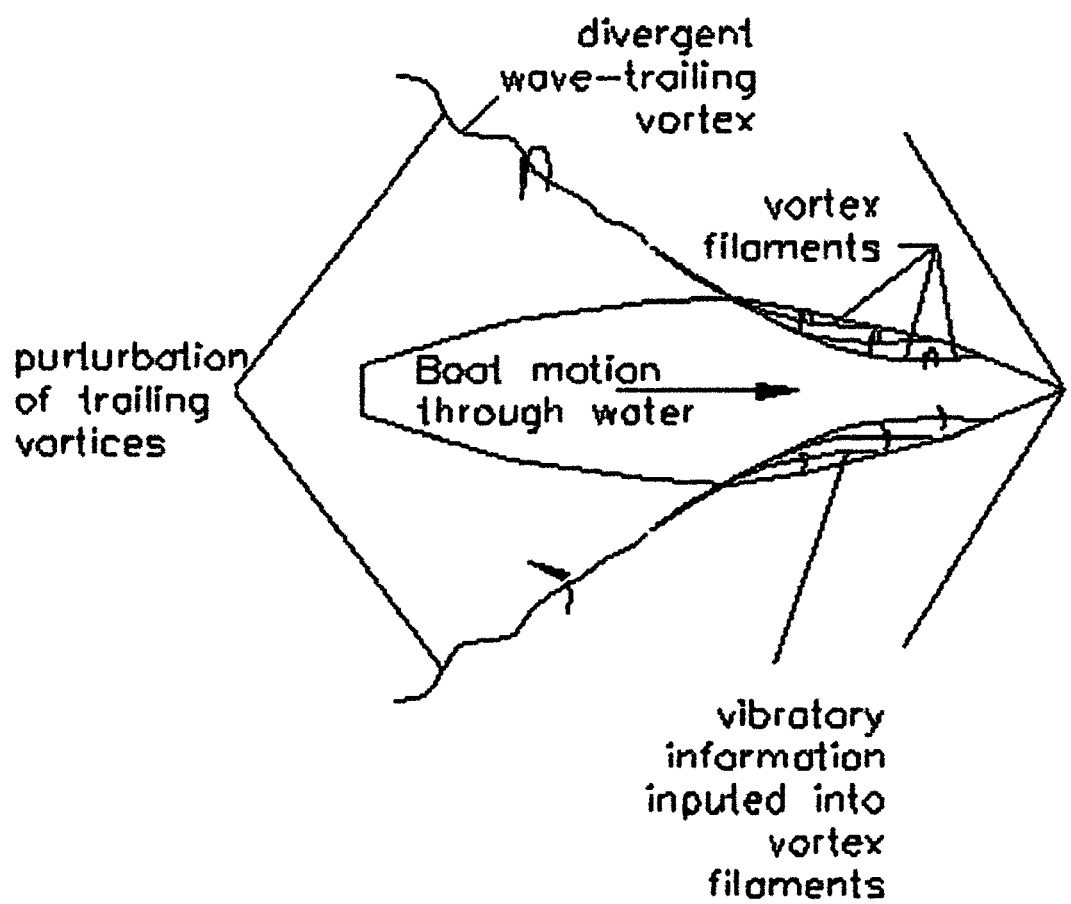

FIG. 12D demonstrates the use of this invention with respect to vortex sheet theory.

| DRAWINGS--Primary Embodiment Reference Numerals | |
|---|---|
| 2 | vessel |
| 4 | top surface (deck) |
| 6 | bottom surface (hull) |
| 8 | bow |
| 10 | stern |
| 12 | step |
| 14 | air intake baffle |
| 14s | air intake baffle on the starboard side of the boat |
| 14p | air intake baffle on the port side of the boat |
| 16 | air duct |
| 16s | air duct on the starboard sie of the vessel |
| 16p | air duct on the port side of the vessel |
| 18 | plenum |
| 20 | waveguide/tuned exhaust-runner(s) port(s) |
| 20s | tuned exhaust-runner ports located on the starboard side of the vessel |
| 20p | tuned exhaust-runner ports located on the port side of the vessel |
| 21 | middle waveguide |
| 21s | middle waveguide located on the starboard side |
| 21p | middle waveguide located on the port side |
| 22 | Helmholtz resonators |
| 22s | Helmholtz resonators located on the starboard side of the vessel |
| 22p | Helmholtz resonators that are located on the port side of the vessel |
| 24 | vibratory generators |
| 24s | vibratory generator located on the starboard side |
| 24p | vibratory generator located on the port side of the vessel |
| 28 | hemispheric ends |
| 28s | starboard hemispheric end |
| 28p | port hemispheric end |
| 30 | longitudinal skirt |
| 30s | longitudinal skirt along the starboard side |
| 30p | longitudinal skirt along the port side |

| DRAWINGS--Alternative Embodiment Reference Numerals | |
|---|---|
| 618 | power source |
| 620 | Computer controlled signal generator |
| 622p | port amplifier |
| 622s | starboard amplifier |
| 624 | electro acoustic transducer |
| 624p | port side electro acoustic transducer |
| 624s | starboard side electro acoustic transducer |
| 626 | sensor |
| 626p | port sensor |
| 626s | starboard sensor |
| 724 | mechanical vibratory generator |
| 726 | flexible member\ribbon |
| 824 | rotational vibratory generators |
| 826 | rotating member |
| 924 | magneto-rheological fluids |
| 926u | upper membrane |
| 926l | lower membrane |
| 928u | upper polar actuator |
| 928l | lower polar actuator |

DETAILED DESCRIPTION—FIG. 1-FIG. 5

Each number (in these drawings) refers to an operable element. Due to the symmetry of this invention, the use of the subscript p is used to refer to the port (left side) and s to indicate the starboard (right side) placement of the elements on the vessel.

Figure 1:
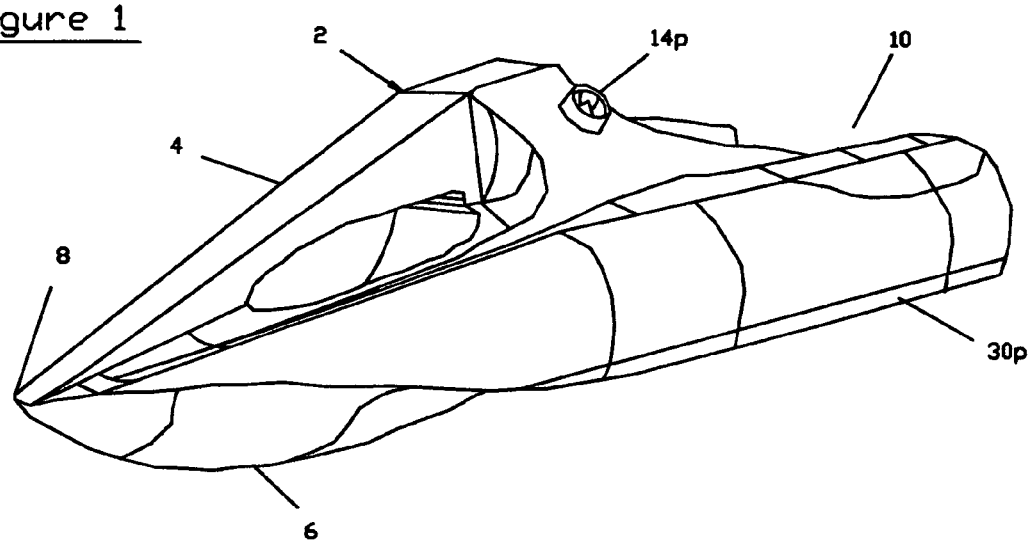
FIG. 1 is a perspective view of a boat with an air duct showing—the rest of the apparatus is concealed.

FIG. 1 (of the drawings) shows a perspective view of a boat\vessel; the vessel 2 has a top surface 4, a bottom surface 6, a bow 8, a stern 10 and showing a port longitudinal skirt 30p. The only visible element of the apparatus shown in FIG. 1 is an air intake baffle 14p that is located on the port side. The air intake baffle 14p has an upward slope with respect to the waterline that minimizing the possibility of water entering into the baffle. The longitudinal skirt 30p is located length wise on the hull and extends slightly below a step 12 (not shown—see FIG. 2).

Figure 2:
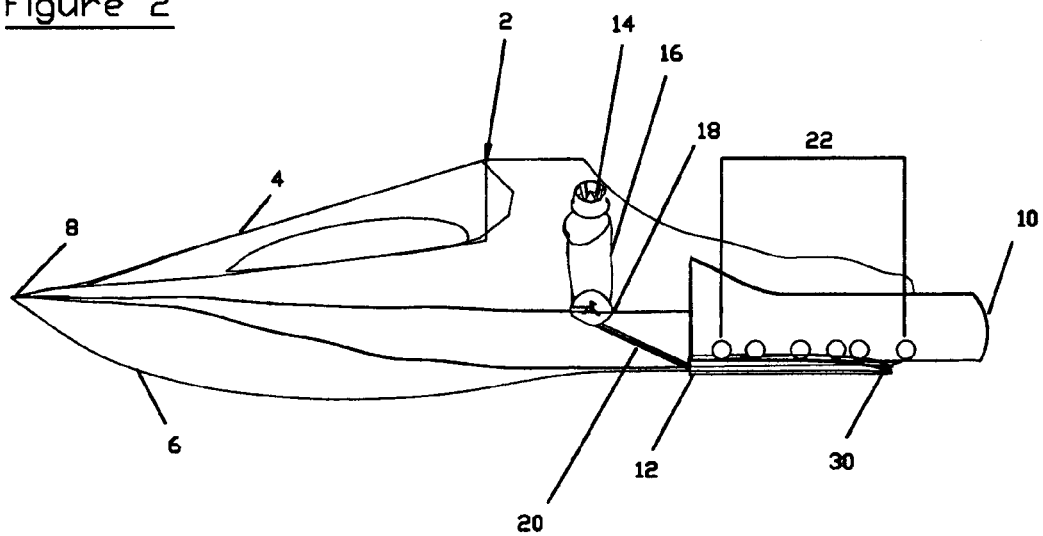
FIG. 2 is a wireframe left side view of the boat, with the apparatus of the invention included into the boat and illustrated with a heavier line weight.

FIG. 2 shows a wireframe side view of the boat and the location of the inventive apparatus within the wireframe. FIG. 2 shows the general form of the apparatus where an air intake system, comprised of an intake baffle 14, is connected to an air duct 16. The air duct 16 connects to a plenum 18. An exhaust-runner port(s) 20 connects on the posterior side of the plenum 18 and terminates at step 12. The longitudinal skirt(s) 30 is located length wise on the hull and extends slightly below the step 12. The exhaust-runner port(s) 20 operate as waveguides and are operationally connected to a plurality of Helmholtz resonators 22.

Figure 3:
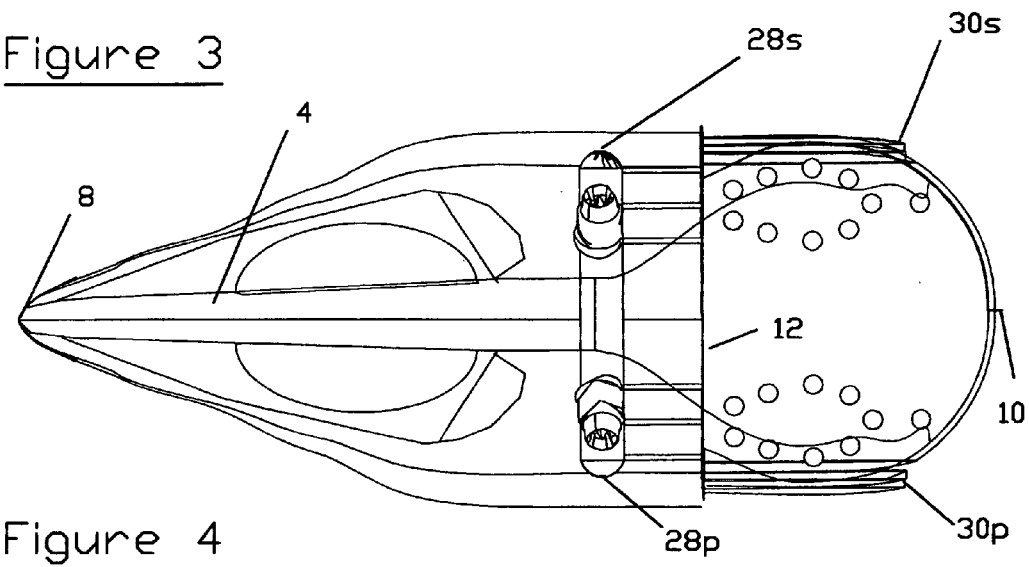
FIG. 3 is a top wireframe view of the boat with the apparatus of the invention included into the boat using a heavier line weight.
Figure 4:
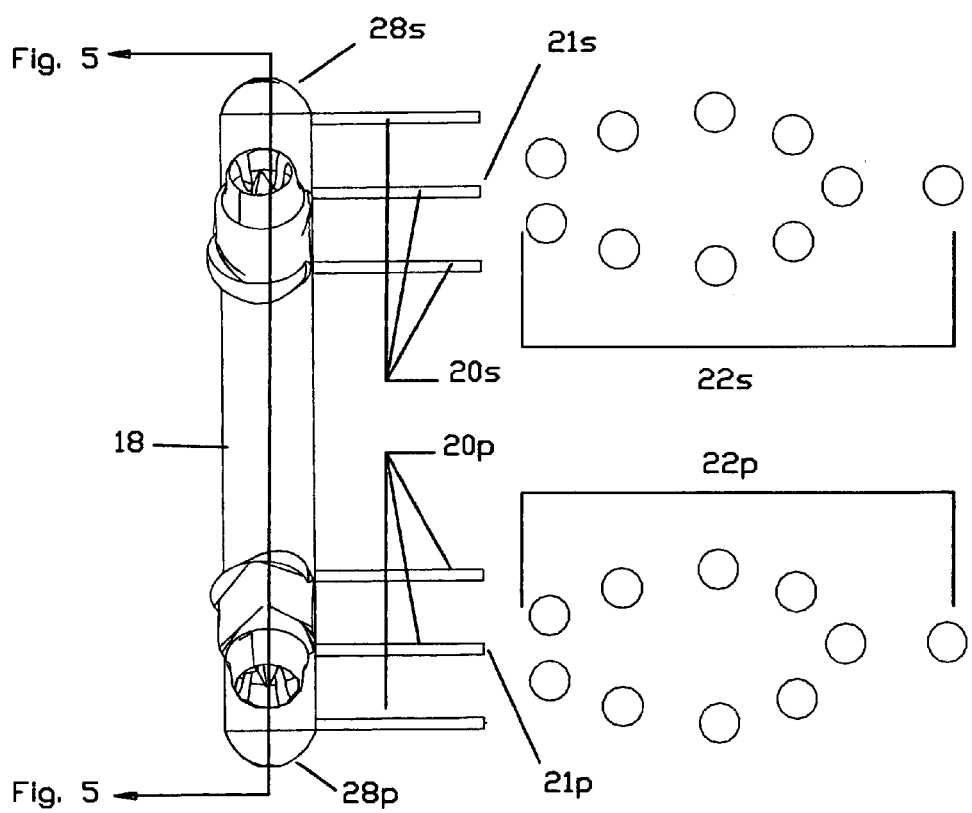
FIG. 4 is a top view of the apparatus only as illustrated in FIG. 3.

FIG. 3 shows a wireframe top view of the vessel with the apparatus in position. FIG. 4 shows an enlarged top view of the apparatus only as shown in FIG. 3. These Figures show the symmetry of the invention, where the port and starboard sides of the elements described in FIG. 2 become visible.

FIG. 4 shows that the plenum 18 has a hemispheric end 28p on the port side; likewise on the starboard side there is a hemispheric end 28s. On the port side of the vessel there is a middle exhaust-runner port 21p that is part of a triplet of exhaust-runner ports 20p, a plurality of Helmholtz resonators 22p are operationally connected to the exhaust-runner ports 20p. Likewise on the starboard side there is a plurality of Helmholtz resonators 22s that are operably connected to a triplet of exhaust-runner ports 20s that contain a middle port 21s. There is a longitudinal skirt 30p on the port side that extends slightly pass the stern 10, likewise on the starboard side the skirt 30s extends slightly pass the stern 10.

FIG. 3 shows the exhaust-runner ports (20p and 20s as shown in FIG. 4) terminate at the step 12.

FIG. 5 is a sectional view as indicated in FIG. 4, this shows the internals of the apparatus where the port intake baffle 14p connects to the port air duct 16p and mounts on the port side of the plenum 18. The port side the plenum 18 has the hemispheric end 28p. A port vibratory generator 24p is mounted inside the plenum 18 and is operationally connected to the middle exhaust-runner port 21p. Similarly on the starboard side of the apparatus the baffle 14s connects to an air duct 16s and mounts to the starboard side of the plenum 18 proximate to a hemispheric end 28s. A starboard vibratory generator 24s mounts to the middle exhaust-runner port 21s. In this embodiment the vibratory generator 24p and 24s is an idealized variable frequency whistle.

Theory of Operation

At this point a discussion regarding the theory of operation is required so that each element and the operation of this invention will become clearer. This disclosure will illustrate the principles of the invention without defining every aspect of the fluid mechanic theories, jargon and the particularities used. The fundamental theories in the operation of this invention are explained to my understanding; however I do not wish to be bound by this.

There are several embodiments of this invention, but some of the fundamental elements include a variable vibratory generator (or some form of adjustable oscillator), a control apparatus that applies a transfer function to the vibratory generator, and some method of transmitting the vibratory information from the vibratory generator to the fluid flow (proximate to the hull). When a surface watercraft moves through water there are two main forms of hydrodynamic drag: wave drag and viscous drag. This invention primarily uses fluid wave mechanics (the associated drag), and the ratio of boat speed to boat length (which is called the Froude number), to enhance the performance of a water vessel. This non-dimensional Froude number is usually used when discussing wave drag (see FIG. 12A).

The first step is to determine the precise characteristics of the fluid flow for the particular hull in which the invention is going to be used. This is a critical step in the development of the transfer function. The precise characteristics of the fluid flow must be resolved for the entire operating conditions of the hull in question. This can be accomplished by analytical techniques such as using computational fluid dynamic programs (CFD), and/or model testing techniques. Some of the characteristics of the fluid flow that must be determined are: vortex sheet characteristics (e.g. vortex lines\filaments, circulation\vortices, velocity potential, stream function, etc), wave patterns, wake flow, and general fluid flow kinematics. Reiterating, the fluid flow characteristics must be resolved for the entire Froude number and operating range of the particular hull, as this information is used in the development of the transfer function. The transfer function is used to control the output of the vibratory generator(s).

In this embodiment the vibratory generator will use acoustic technology; a variable frequency whistle is used as the vibratory generator. The acoustic information is transferred to the airflow generated by the vented hull and this will provide means for transmitting vibratory information to the fluid flow under the hull. Other implementations of this invention can use different vibratory generators, control systems, and application methods. This will be elaborated in the later section of alternative embodiments.

The development of the transfer function uses wave and vibration mechanics in the tuning process. The following discussion will explain some of the techniques used in the development of the transfer function. The information of the analysis of the fluid flow is used to develop the transfer function. The designer can adjust the output of the vibratory generators based on these mechanics. A skilled designer can use a multitude of techniques to develop the transfer function for this apparatus.

Some parameters that are used in the development of the transfer function include frequency factors, acoustic power factors, wave kinematics, group and phase speed factors, interference, phase, harmonic output, intensity outputs, modulation, dampening, and the vortex line interferometric interactions. Techniques illustrated in the development of the transfer function for this discussion, include, signal theory, harmonic excitation and the damping with facets of perturbation theory. The fluid flow analysis is used to determine which techniques are most effective for the particular modality and Froude number.

As already mentioned the hulls of any vessel are generally rigid structures, where the nature of the fluid flow is generally affected by the hull morphology. Previously, the fluid flow was determined by the hull morphology and this apparatus dynamically interacts with the fluid flow affecting the fluid flow (that previously was primarily determined by the hull form). As the vessel moves through the water, various wave systems result (see FIG. 12B and FIG. 12C). These various wave patterns form interactions that can be shown in FIG. 12A, where humps and hollows show the resulting drag undulations from these interactions. These undulations are a result of the interaction of the hull and the various wave systems as the vessel moves through the water.

There are three primary modalities\configurations of this invention. In one configuration, this invention operates based on the wave system and focuses particularly on the wave patterns generated by the hull (including the bow wave), the transverse wave pattern, and the fundamental frequency of the boat with respect to the trans-planing speed. In the second configuration, the apparatus changes its modality and transitions its output with respect to the Kelvin wave system and the vortex sheet. The Kelvin wave system consists of several interactions such as the diverging wave crests from the bow, stern, and transverse wave crests (see FIG. 12C). These wave systems are a physical illustration of the vortex sheet theory. The third modality of this invention is based on the law of the wall coordinate (Walsh and Weinstein, 1978).

The first modality relates to wave kinematics, particularly with the Froude number, transverse wave pattern, bow wave and the trans-planing region. The auxiliary benefits of this embodiment with respect to viscous drag will be discussed later on. Wave drag can be plotted with respect to boat speed (see FIG. 12A). There are humps and hollows in wave drag until about Froude 0.5. The trans-planing region is approximately Froude 0.4 to 0.5. Generally after Froude 0.5 the vessel is hydroplaning.

The bow wave makes it more difficult for the vessel to begin hydroplaning. In this modality the fundamental frequency of the boat is determined at the onset of planing. Referring to Figure A, the semi-planing region is approximately from 0.4 to 0.5 Froude. The hump at the onset of planing is approximately Froude 0.3; the natural frequency of the boat is then calculated at this Froude number. The various wavelengths shown in FIG. 12B are used to develop the transfer function. The transfer function is used to control the output of the vibratory generator. Two tuning methods are illustrated in this modality using sympathetic and cancellation techniques.

The vibratory generator is tuned to a sympathetic frequency (as determined by the natural frequency of the hull) at the onset of hydroplaning and the bow wavelength. As the boat accelerates to semi-planing region (approximately Froude 0.3), a sympathetic vibration occurs between the hull and the fluid flow. This causes resonance between the hull and the fluid flow at the onset of hydroplaning, thereby helping to compensate for the bow wave. Also the transfer function can incorporate a cancellation technique, where the vibratory generator outputs an inverse resonance frequency. The designer can use a combination of these techniques in the development of the transfer function whereby the output can cycle between different techniques, or use a technique that is most effective for the particular hull.

In this example, at approximately Froude 0.3 the natural (fundamental) frequency of a vessel is calculated to be three Hertz (Hz). Thus an overtone frequency is calculated to be 3000 Hz (the 999 overtone or an overtone that is most efficacious for the particular hull, flow characteristics, or embodiment type). As the vessel accelerates to planing speed, a sympathetic vibration occurs between the hull and the fluid flow, causing resonance. The output of the apparatus is controlled by the transfer function, whereby the vibratory output is a function of the hull at the onset of planing (thereby minimizing the bow wave effect).

The transfer function can incorporate a cancellation technique in controlling the output of the vibratory generator. In this example when the Froude number is 0.3 a wave pattern is illustrated in FIG. 12B. The transfer function can incorporate cancellation techniques where the vibratory generator outputs an inverse function $F^{-1}(t)$ of the wave pattern at Fn=0.3 (as shown in FIG. 12B). The transfer function is used in the control apparatus to control the output of the vibratory generator, so that the output can be changed rapidly between techniques, wave patterns and operating conditions of the vessel. The vibratory generator can use a feedback loop so that the output can quickly change techniques from instance to instance. Two techniques have been illustrated that show how the transfer function can change the output of the vibratory generator from one regime to another. The development of the transfer function is based on the analyses of the reactions between the vibratory generator(s), the hull, and the fluid flow (as illustrated in the electronic implementation of the alternative embodiment).

The apparatus transitions modalities between the first and second modality based on the Kelvin wave system and the vortex sheet theory. The transfer function is developed based on the results of the analysis of the fluid flow with respect to the particular hull the apparatus is going to be incorporated into. The second modality of this invention relates to the reaction between the vortex sheet and the hull of the vessel. Once the fluid flow is fully analyzed the designer can begin to configure the vibratory generator to interact with the parameters of the vortex sheet and the hull. These configurations are incorporated into a transfer function that controls the output of the vibratory generator. The output from the vibratory generator is changed depending on the performance objectives of the designer.

Some of the characteristics of the vortex sheet that should be determined include, the stream function ($\psi$), velocity potential ($\phi$) (—that satisfy the Cauchy-Riemann condition), coordinate system such as Cartesian (x, y, z), polar (r,θ) or law of wall (h+, s+ . . . this coordinate system is important in the third modality of the invention) and vortex lines/filaments.

In this modality two techniques are discussed in the development of the transfer function; they include signal theory and perturbation theory. FIG. 12C shows the divergent wave pattern as the boat moves through the water (this forms a sort of 'envelope'). Modulation techniques are used in this modality. The designer uses this information with analytical techniques such as Fourier or phasor analysis in the development of the transfer function. The function F(t) is developed based on the divergent wave pattern (i.e. the envelope). The inverses function $F^{-1}(t)$ is used to change the divergent wave's motion (amount δ—the illustration of FIG. 12C is exaggerated for demonstrative purposes). This attenuation results in a different wake flow. Thereby affecting drag characteristics and some of the undulations illustrated in FIG. 12A.

FIG. 12D shows how the transfer function can use harmonic excitation and\or perturbation theory in the tuning process; the placement of the oscillator or apparatus is critical to this technique. Harmonic excitation can be added to the vortex filament that can manifest into a larger perturbation of the trailing vortices, (see FIG. 12D) thereby affecting the wake shape. The divergent wave patterns form an envelope where analytical techniques as described above can be used. A vibratory function can be constructed bound by this envelope. The transfer function can be configured so that vibratory generator can transmit various harmonic outputs that affect vortex lines kinematics, wake flow, and phase velocity.

Very complicated transfer functions can use a combination of techniques to control the output of the vibratory generator, whereby the output can cycle through a series of functions that can have a cumulative effect. The technique can cycle from perturbations of the trail vortices to the use of modulation techniques (as described above), interferometric and phase and group speed to adjust the various fluid flow characteristics. A skilled designer can use this information to adjust the invention so that the output of the vibratory generator can shape the wake flow and the resulting performance.

The third modality to this invention relates to the law of wall coordinates [Walsh and Weiwinstein (1978), Walsh and Lindemann (1984)]. When the boundary layer is at full turbulent, this modality can be utilised. When the boundary layer is fully turbulent, eddy viscosity can develop that contributes to higher levels of skin drag. By developing the transfer function to correlating with the s, h, or S+, h+, dimensions, the output of the vibratory generator can help reduce the turbulent skin friction drag (resulting from the eddy viscosity).

The above principles are quickly illustrated in this particular embodiment. This apparatus uses an air intake system that employs ducts to channel air from the deck to the bottom of the hull. As the vessel moves through water, suction occurs under the hull at step 12 and this suction is used to draw air into the apparatus. The amount of suction is related to the displacement of the vessel and to boat speed (i.e. Froude number). The airflow is directed into an air intake system into the plenum 18 and directed to a vibratory generator (24s and 24p; see FIG. 5).

In the primary embodiment of this invention the vibratory generator is an idealized spring-loaded variable output whistle whereby the whistle frequency (i.e. whistle length) is controlled by the spring rate. In this simplified embodiment the transfer function is incorporated into the spring rate and control mechanism, which is related to the vacuum pressure at the step. At different speeds there are different pressures at the step. The frequency of the whistle is changed with respect to the pressure. The detail operation of this device is not fully illustrated since it is part of the current art. The airflow is discharged under the hull through tuned exhaust-runner ports 20 that operate as waveguides (see FIG. 2).

The whistle is used to sonicate the airflow and the waveguides transmit the vibratory information in an efficient manner to the desired location. The Helmholtz resonators 22 are tuned to augment the vibratory information within the fluid flow under the hull. In other implementations the vibratory generators 24p and 24s may include mechanical sonic devices such as the use of a variable frequency siren, a multi-cavity pea-less whistle, a mechanical siren or some type of transducer. This embodiment uses vented hull technology to add vibratory information to the fluid flow; the vibratory information can be produced using other methods.

There are many secondary effects to this embodiment that are not the primary focus of the invention, such as the sonic properties of the vibratory generator add acoustic power to the airflow, thereby assisting in the aeration of the hull thereby effecting viscous drag. The vibratory generator can augment the handling of the vessel; instabilities such as 'chine walk' can be tuned out or instabilities can be added to quicken responsiveness in handling. An entire subsection of handling tuning considerations can be incorporated into this apparatus.

Alternative implementation of this invention can be, mechanical, electro-mechanical (as shown in FIG. 7 to 9A) and electronic (as shown in FIG. 6) vibratory generators. Each of these implementations of the invention has their own specific characteristics that effect that particular implementation. For example in alternative embodiments such as shown in FIG. 8 and FIG. 8A, the rotating element adds the Magnus effect (which is particular to that embodiment). Other embodiments do not have those particular characteristics. Several of the most likely embodiments are disclosed in this application, this is done to illustrate how this innovation can be applied in various other formats. There are particularities with each alternative embodiment and some of these particularities will be discussed with each embodiment type.

As previously stated there is a wide variety of tuning considerations in the development of the transfer function. The particularities of the transfer function are highly dependent on the actual implementation and physical structure of the boat and apparatus. Only some of the techniques have been briefly explained and some more complicated implementations include complex algorithms that can use other techniques not illustrated here, such as the use of complex adaptive systems, holographic interferogram, and other Interferometric techniques.

Detailed Operation of Primary Embodiment—FIG. 1-FIG. 5

Referring to FIG. 2, as the vessel moves through the water, a fluid flow occurs around the bottom of the vessel 6. This fluid flow generates suction at a step 12. The air intake is a closed system so that the vacuum at the end of the exhaust runner(s) 20 is transmitted up the system. The suction at the step 12 generates a vacuum in plenum 18; since the apparatus is a closed system this vacuum causes airflow to enter the air intake baffle 14. At different speeds there are different pressures at the step 12. The airflow is directed into an air duct 16 and is channeled into a plenum 18. The airflow is then directed from the plenum into a tuned exhaust-runner port(s) 20 and exits at the step 12. A plurality of Helmholtz resonators 22 is operationally connected to the airflow discharged from the exhaust port runner(s) 20.

The port operation of this apparatus will be explained and the starboard operation is similar. FIG. 5 shows air entering the air intake baffle 14p on the port side of the vessel. The airflow enters into the air duct 16p. The air duct 16p directs the airflow to the connected plenum 18. In this example the whistle 24p is connected to the plenum 18 at the exhaust-runner port 21p. Displacement and speed variations of the vessel change the suction at step 12 (shown in FIG. 2) thus the pressure in the plenum is changed accordingly. Therefore the spring extends or contracts the whistle length 24p depending on the plenum and/or exhaust port 21p and 21s pressure, thereby the frequency is varied. The transfer function is incorporated within the whistle design and spring rate. The airflow enters whistle 24p from the plenum 18 and continues into an exhaust-runners 20p and discharges at the step 14 (as shown in FIG. 2). Due to symmetry of this apparatus the starboard side operates in a like manner. The plenum has a duel function, primarily to stabilize pressure variations and to act as a resonator. The plenum helps to sonicate the airflow.

The geometry of the plenum allows for suitable air pressure to develop within the plenum chamber. FIG. 2 shows the profile of the plenum 18 is designed to direct acoustic waves into the exhaust-runners 20, 20p, and 20s. FIG. 4 and FIG. 5 show the hemispheric ends 28p and 28s and these are designed to augment the sonic emissions from the whistle (24s and 24p as shown in FIG. 5). FIG. 4 shows the port and starboard Helmholtz resonators 22p and 22s that are placed based on the acoustic emissions from the port and starboard exhaust-runners ports 20p and 20s. The spectra of the sound radiation emitted from the middle runner 21p results in the resonators to be laid out in a pattern 22p. Similarly, on the starboard side the middle exhaust-runner 21s discharges, resulting in the pattern 22s. Due to the symmetry of this invention the starboard side operates in a similar manner as the port side. FIG. 5 shows the starboard side and the whistle 24s which connects to the middle exhaust-runner 21s.

Concluding Discussion on the Operation of the Primary Embodiment—FIG. 1 and FIG. 3

The designer has many parameters that can be adjusted in this embodiment such as, the acoustic properties (i.e. whistle design, waveguide design, plenum design), properties of the sounding elements, materials, stream lining, and related aerodynamic factors in the design of the air intake, the plenum, and tuned exhaust-runner(s) ports.

For example some of the acoustical parameters that can be changed include the step 12 which can have a concave shape, forming an acoustic lens that would accentuate the acoustic properties of the vibratory generator. The longitudinal skirts 30p on the port side and 30s on the starboard side, incorporate ground effect technology to help maintain the airflow under the hull. Some aspects of ground effect technology include the profile of the skirt that affects the fluid jets (air and water) around the periphery of the vessel, also the skirt depth that affects the airflow under the hull.

This section briefly illustrates some of the various different theories that this apparatus uses and some of the types of tuning techniques. This disclosure did not include a full discussion on the algorithms used in the transfer function, all the tuning possibilities, and the related theories\mathematics associated with the implementation of the apparatus. The transfer function is particular to the hull morphology and embodiment type of the invention. This has been a broad disclosure on the implementation of this invention; someone skilled in the art of fluid and vibration mechanics will understand the associated theories and relevant variations that appear in the final apparatus.

Description and Explanation—of Alternative Embodiments

In other embodiments of this invention, other types of vibratory generators, transmission mediums and control systems can be used. Not all the general componentry such as the circuit layouts, power sources, power transmissions, control systems are illustrated in this section. Included is a brief discussion of how the apparatus can operate using different forms and some of the particularities accompanying each embodiment.

Alternative Embodiments—FIG. 6 Embodiment Using Electronics

FIG. 6 shows an electronic implementation of the primary embodiment (similarly configured to the primary embodiment shown in FIG. 5). The port vibratory generator is an electro acoustic transducer 624p and the starboard vibratory generator is another electro acoustic transducer 624s. A computer controlled signal generator 720 outputs to a port amplifier 622p; this powers the port transducer 624p. Likewise for the starboard side the amplifier 622s powers the starboard transducer 624p; the amplifiers receive their signal from a computer controlled signal generator 720. The computer controlled signal generator varies its output to each transducer 622p and 622s depending on the inputs of each sensor 626p and 626s. This system requires a separate electrical power source 618 to operate. The designer can choose the best sensor that determines the nature of the fluid flow (for example he/she may choose a pressure, acoustic, or an optical sensor).

In this embodiment the designer has significantly greater control than in the simplified mechanical acoustic of the primary embodiment. The transfer function is programmed into the computer control signal generator. A sensor is used to determine the characteristic of the fluid flow; the computer controlled signal generator is more dynamic and will output the proper vibratory information depending on the input of the sensors. This is a more sophisticated system and this system incorporates feedback loops (that further refines the implementation of this invention).

Alternative Embodiments—FIG. 7 and FIG. 7a—Embodiment Using Transverse Oscillating Electromechanics The following explanation will refer to FIG. 7 and FIG. 7A, which shows an electromechanical implementation of this invention, where the vibratory generator is a mechanical device, like a tuning fork structure 724. This structure oscillates back and forth at various frequencies. In this embodiment the vibratory generator can be powered by electrical or mechanical energy. A flexible film 726 or membrane is mated to the mechanical vibratory generator 724. The film can be constructed of a material, with sufficient degrees of freedom that is conducive to the transmission of vibrations (such as thin wires, metallic sheeting, filaments, ribbons, or elastometric material). The vibratory generator oscillations transmit vibratory information to the film and by extension to the fluid flow. Depending on the waveform generated, a form of peristaltic motion can develop as a secondary effect in this type of embodiment.

Alternative Embodiments—FIG. 8 and FIG. 8a—Embodiment Using Rotational Electromechanics FIG. 8 and FIG. 8A show another electromechanical implementation. In this embodiment a rotational vibratory generator 824 is used to apply the vibratory information to the vortex sheet. The rotating member 826 is a cylinder where the vibratory information can be changed by adjusting such factors as the rotational shape (i.e. cylinder, sphere, etc), placement (i.e. location and orientation), rotation speed and rotation direction (i.e. clockwise, counterclockwise). The vortex sheet can be manipulated by varying the above parameters in combination with the secondary effects such as the Magnus effect and the placement of the vibratory generators.

Alternative Embodiments—FIG. 9 and FIG. 9a—Theoretical Embodiment Using a Double Hull FIGS. 9 and 9A shows a theoretical implementation of this invention that addresses the static nature of hulls. Where the vortex sheet characteristics are a function of hull geometry, the hull geometry could be changed. In this embodiment the hulls parametric properties can be changed with respect to the Froude number. There are many means to accomplish this such as using an articulation hull, the use of Electrostrictive Polymer Film (EPF technology is used in loudspeaker designs), or other membranes that can cover the hull. To illustrate how this applies to this invention, the apparatus uses a magneto-rheological fluid 924 sandwiched between an upper membrane 926u and a lower membrane 926l. These membranes are operationally connected to the hull 6. Embedded in the membranes are upper polar actuators 928u and lower polar actuators 928l. Energizing and de-energizing the actuators can set up a waveform pattern(s) within the membranes. Also the actuator can remain energized thereby the parametric properties of the hull is fixed as a function of the Froude number.

Conclusion, Ramifications and Scope

This description shows a wide variety of tuning techniques for this apparatus. The apparatus can be optimized for a particular performance objective of the hull. The description also shows that the transfer function (i.e. the controlling algorithm) can be incorporated into a mechanical or electronic control apparatus. Finally the means of applying the vibratory information to the fluid flow can take a wide variety of forms.

The embodiments presented in FIG. 6 and FIG. 8 incorporates various types of mechanisms that are readily available. There is a new class of micro-electro-mechanical (MEMS) devices that if cost-effective the hull may be laid with these types of servomechanisms. These MEMS could be configured to operate similarly to a cellular organism such as a Paramecium; these organisms have their body covered with cilia (a type of flagellum) to interact with the fluid around them and produce cillary motion. An example of this type of implementation could include incorporating MEMS devices such as Texas Instruments DLP™ chips in the hull so that the operative elements of the chip can manipulate the vortex sheet.

The alternative embodiments described above demonstrated the scope of this invention, while only a single embodiment of the present invention has been wholly described and illustrated. The present invention is not limited to the features of this description, but includes all variation and modifications within the scope of the claims.

The embodiments of the invention in which an exclusive property or privilege is claimed are defined as follows:

1. A harmonic apparatus facilitating the performance of a vessel moving through a fluid comprising: at least one acoustic vibratory generator; an air intake system; the vibratory generator produces a vibration with reference to interactions between the fluid and the moving vessel; and means of utilizing said air intake system to transmit vibrational information from said acoustic vibratory generator to influence the fluid proximate to said vessel, where said acoustic vibratory generator is operationally connected to a plenum and at least one tuned runner.

2. The apparatus as claimed in claim 1, wherein said air intake system has: at least one air intake baffle; at least one inner plenum; at least one air duct connecting the air intake baffle to the plenum; the vessel has a top, a bottom, a bow, a stern, a starboard side, a port side, a waterline; and at least one tuned runner port to vent air from the plenum to the bottom of the vessel.

3. The apparatus as claimed in claim 2, wherein the vibratory generator is a whistle tuned to emit an overtone frequency, whereby the overtone frequency is calculated based on at least one fundamental frequency of the vessel and fluid characteristics at the onset of hydroplaning.

4. The apparatus as claimed in claim 2, whereby the plenum is cylindrical with hemispherical ends designed to focus sound waves from said acoustic vibratory generator into the tuned runner port.

5. The apparatus as claimed in claim 4, whereby the parameters of said air intake system includes parametric properties, airflow streamlines, and acoustic properties that are optimized to exploit the effectiveness of the vibratory generator and the air intake system.

6. The apparatus as claimed in claim 4, whereby the tuned runner port has parametric properties, including, a circular cross sectional area, a port length that are in accordance with the whistle frequencies, and are designed to increase effectiveness of the air intake system relative to the bottom of the vessel.

7. The apparatus as claimed in claim 6, wherein the runner port operates as a waveguide.

8. The apparatus as claimed in claim 2, whereby the air intake baffle has a conical cowl with an upward slope distal-proximate to the waterline that minimize the possibility of water entering the air intake; and a trap that stops water from entering the air duct.

9. An apparatus as claimed in claim 2, wherein the vessel has a stepped hull that forms a concavity from the runner port's exit to the stern.

10. The apparatus as claimed in claim 9, whereby the concavity of the vessel forms a baffle conducive to transmission of sound waves from said acoustic vibratory generator.

11. The apparatus as claimed in claim 9, where the concavity blends into longitudinal sides to form guides along the starboard and port length of the concavity; thereby improving acoustic and airflow properties from the air intake system.

12. The apparatus as claimed in claim 2, wherein the improvement comprises:
at least one resonator operationally connected to the vibratory generator with means for maximizing the effectiveness of the vibratory generator.

13. The apparatus as claimed in claim 12, wherein there is a plurality of Helmholtz type resonators, wherein vibratory analysis is used to determine parametric properties of said Helmholtz resonators, including aperture geometry, resonator volume, neck length and placement.

14. The apparatus as claimed in claim 13, whereby the resonators apertures open onto the bottom of the vessel and their placements and quantity are determined by vibratory analysis.

15. A tuned hull in a fluid flow, comprising:
an adjustable sonic vibratory generator, a feedback loop system connected to the vibratory generator and operationally based on interactions between the hull's morphology and the fluid flow, a transmission medium wherein vibratory information from said adjustable sonic vibratory generator propagates, the transmission medium is operationally connected to the hull of a vessel, the vibratory generator produces a vibration with reference to interactions between the fluid and the moving vessel whereby, the feedback loop system adjusts the vibratory generator based on attributes of the fluid flow thereby influencing the fluid flow in so doing facilitating the performance of the hull.

16. An adjustable vibratory apparatus operably connected to a body exposed to a fluid flow whereby the vibratory apparatus produces a vibration with reference to interactions between the fluid and the body, a transmission means for conveying vibratory output from the vibratory apparatus into the fluid flow, regulated by a feedback loop system capable of sensing attributes of the fluid flow and adjusting the vibratory apparatus so that the fluid flow can be manipulated.

* * * * *